May 25, 1965    O. C. KINDORF    3,185,419
PIPE HANGER
Filed Feb. 25, 1963
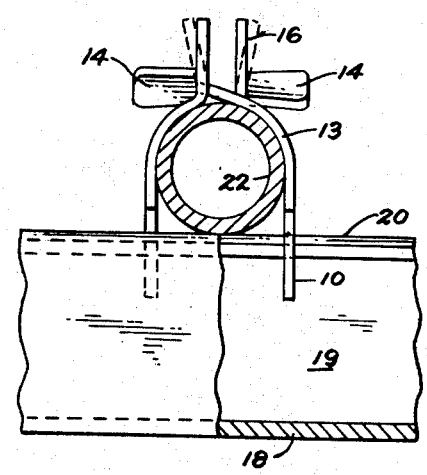
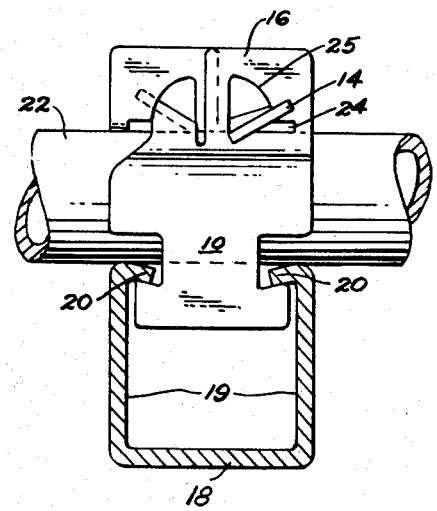
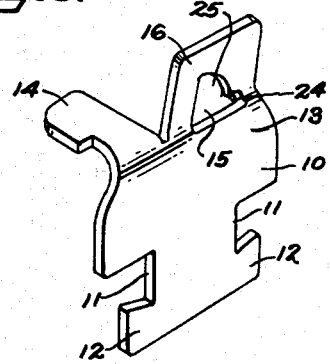
INVENTOR.
ORLAN C. KINDORF
BY
Fryer & Tjensvold
ATTORNEYS

United States Patent Office 3,185,419
Patented May 25, 1965

3,185,419
PIPE HANGER
Orlan C. Kindorf, 500 Mountain Ave., Piedmont, Calif.
Filed Feb. 25, 1963, Ser. No. 260,764
4 Claims. (Cl. 248—73)

This invention relates to pipe hangers of the kind employed for securing pipe conduit cables and the like to supporting brackets.

Many pipe supports comprise a metal channel-shaped beam, sections of which are assembled into supporting structures presenting horizontal and vertical members to which pipe may be secured. The beam has inwardly turned flanges on its legs providing a continuous slot and employed for interengagement with various types of supporting and securing means. Most such securing means include threaded parts or nuts and bolts to effect tight embracing of the pipe and firm engagement between the pipe and the beam. Threaded parts are costly, difficult to manipulate and add to the total number of parts required to form a single hanger unit.

It is an object of the present invention to provide a low cost and easily installed pipe hanger of only two parts for use with slotted channel supports of the kind referred to above.

A further object is to provide such a pipe hanger which may be installed without special tools and will firmly engage the pipe upon installation.

Further and more specific objects and advantages of the invention are made apparent in the following specification wherein reference is made to the accompanying drawing.

In the drawing:

FIG. 1 is a view in elevation with parts in section of a pipe secured to a channel by the pipe hanger of the present invention;

FIG. 2 is a view in elevation at right angles to FIG. 1 of the same; and

FIG. 3 is a perspective view of one of two identical parts which form the pipe hanger.

As best shown in FIG. 3, each part of the pipe hanger comprises a flat plate 10 having notches 11 in its opposite side to provide a pair of oppositely extending lugs 12 adjacent one end of the plate. Toward its other end the plate is curved as at 13 to conform to the size and shape of the pipe with which the hanger is to be used and terminates in a hook 14 and an eye 15 formed in a portion 16 of the plate. The portion 16 is disposed in a plane nearly parallel to the main portion 10 of the plate and the hook extends away from the plate at right angles thereto.

The use of two such members to secure pipe with respect to a channel is illustrated in FIGS. 1 and 2 wherein a channel is shown as having a web 18, two legs 19 and flanges 20 extending inwardly from the ends of the legs. The flanges of the particular channel as shown are inclined inwardly of the channel and the lugs 12 of the hanger plate are inclined correspondingly to closely embrace the inner surfaces of the flanges. Similar channels are manufactured with flanges of different shapes and the lugs of the hanger can be shaped to conform to the flanges of any particular type of channel.

To secure a pipe such as shown at 22 to the channel, two of the hanger plates such as shown in FIG. 3 are inserted edgewise through the slot between the flanges 20 of the channel and then turned at right angles to effect interengagement between the lugs and flanges as most clearly shown in FIG. 2. In this position, the two plates are brought toward each other to embrace the pipe as shown in FIG. 1 with the hook 14 of each plate extending through the eye 15 of the other. The hooks 14 are then twisted to the angular position shown in FIGS. 1 and 2 so that the hooked end of each lies behind the portion 16 of the other plate adjacent the eye 15. To enable this engagement between the hooks and eyes, the eyes are formed with a large or long opening 24 at their lower portion and are narrower and curved as at 25 thereabove. Consequently the hooks in their initial flat position as illustrated in FIG. 3 pass freely through the elongated slot portions 24 of the eye as the two hanger elements are brought toward each other to embrace the pipe and then upon twisting of the hooks the hooked ends thereof engage behind the parts 16 adjacent the curved edges 25 of the eyes. To insure firm engagement of the assembled parts, the portions 16 in which the eyes are formed are originally disposed at a slight angle to a plane parallel to the main plate 10. Thus they originally assume the diverging relationship illustrated in dotted lines in FIG. 1. Consequently upon twisting of the hooks, a camming action takes place between their hooked ends and the members 16 springing the members to the parallel positions shown in full lines in FIG. 1 and causing both of the hanger elements to closely embrace the pipe with a resilient force. Still further pressure is exerted by slight shortening of the hooks 14 which results from their being twisted.

The hanger of the present invention is illustrated in the drawing as securing the pipe on top of a channel-shaped support. It is evident, however, that the channel may be inverted from a position shown and the pipe supported therebeneath or further the pipe may be supported alongside of a vertically disposed or inclined channel. When the pipe is disposed beneath the channel, the hanger disclosed has a further advantage in that simply bringing the two hanger portions together to embrace the pipe, temporarily supports the pipe in its position against the bottom of the channel so that it need not be supported by other means while a workman imparts a twist to the hooks 14. No special tool is required for twisting the hooks as they may be readily twisted with pliers, various types of wrenches, the claw of a carpenter's hammer or even a straight tool such as a chisel or screwdriver which may be employed to pry the hook toward its twisted position.

Furthermore the pipe hanger of the present invention is inexpensive since its two identical parts are simple stampings and may be made of any suitable ductile metal.

I claim:

1. A pipe hanger comprising two elements each having a hook and an eye adjacent one end, means to secure the elements adjacent their opposite ends to a beam across which a pipe to be supported is disposed for movement into contact with opposite sides of the pipe, the hook of each element being disposed to pass through the eye of the other element upon such movement, said eye having a wide portion and a narrow portion, and said hook having a hooked end which is received through said wide portion and engages an edge of the narrow portion upon twisting of the hook.

2. The pipe hanger of claim 1 in which the portions in which the eyes are formed are inclined away from each other before twisting of the hooks and drawn toward each other upon twisting of the hooks to cause the elements to embrace the pipe firmly.

3. A pipe hanger comprising two elements each having a hook and an eye adjacent one end, means to secure the elements adjacent their opposite ends to a beam across which a pipe to be supported is disposed for movement into contact with opposite sides of the pipe, the hook of each element being disposed to pass through the eye of the other element upon such movement and to engage the other element adjacent the edge of the eye upon twisting of the hook, said eye being formed with an elongate portion to admit the hook in one position and a shorter portion with a curved edge to permit twisting of the hook throughout its length and engagement thereof adjacent said curved edge.

4. The pipe hanger of claim 3 in which the two elements are identical.

References Cited by the Examiner

UNITED STATES PATENTS

| 2,201,611 | 5/40 | DelCamp | 248—361 |
| 2,535,427 | 12/50 | Kindorf | 248—68 |

FOREIGN PATENTS

| 524,708 | 8/40 | Great Britain. |

FRANK L. ABBOTT, *Primary Examiner.*